US005597419A

United States Patent [19]

Gerbasi et al.

[11] Patent Number: 5,597,419

[45] Date of Patent: Jan. 28, 1997

[54] SLOW BRUSH ROTATION IN STANDBY TO AVOID BRUSH FLAT SPOTS

[75] Inventors: Dennis G. Gerbasi; Bruce E. Thayer, both of Webster; Clark V. Lange, Ontario, all of N.Y.

[73] Assignee: Xerox Corporation, Stamford, Conn.

[21] Appl. No.: 644,469

[22] Filed: May 10, 1996

Related U.S. Application Data

[63] Continuation of Ser. No. 354,391, Dec. 17, 1994, abandoned.

[51] Int. Cl.[6] .................... G01G 21/00

[52] U.S. Cl. .................... 134/6; 15/256.51; 15/256.52; 15/256.53; 399/345; 399/353

[58] Field of Search .................... 134/6; 355/296, 355/301, 303; 15/256.51, 256.52, 256.53

[56] References Cited

U.S. PATENT DOCUMENTS

| | | | |
|---|---|---|---|
| 3,590,412 | 6/1971 | Gerbasi | 15/1.5 |
| 3,728,016 | 4/1973 | Harbour, Jr. et al. | 355/15 |
| 3,818,859 | 6/1974 | Kalmar | 118/24 |
| 3,848,994 | 11/1974 | Fraser | 355/15 |
| 4,172,303 | 10/1979 | Wooding et al. | 15/256.52 |
| 4,213,794 | 7/1980 | Wooding et al. | 134/6 |
| 4,269,503 | 6/1981 | Nishikawa | 355/15 |
| 4,449,241 | 5/1984 | Nakayama | 118/699 |
| 4,490,871 | 1/1985 | Martin | 15/21 |
| 4,501,620 | 2/1985 | Oda | 134/6 |
| 4,819,026 | 4/1989 | Lange et al. | 355/15 |
| 4,819,031 | 4/1989 | Thayer et al. | 355/15 |
| 4,835,807 | 6/1989 | Swift | 15/1.5 R |
| 4,975,748 | 12/1990 | Koinuma et al. | 355/305 |
| 5,229,817 | 7/1993 | Lange et al. | 355/209 |
| 5,241,352 | 8/1993 | Lange et al. | 355/301 |
| 5,257,079 | 10/1993 | Lange et al. | 355/303 |
| 5,317,781 | 6/1994 | Thayer et al. | 15/309 |
| 5,329,344 | 7/1994 | Gerbasi et al. | 355/301 |
| 5,400,129 | 3/1995 | Lange et al. | 355/301 |

*Primary Examiner*—Jill Warden
*Assistant Examiner*—Sharidan Carrillo
*Attorney, Agent, or Firm*—T. L. Fair

[57] ABSTRACT

An apparatus and method for moving a cleaning brush, periodically or continuously, to avoid flat spots or voids in the cleaning brush fibers when the printing machine is in standby or off. Periodic movement of the cleaning brush or slow rotation of the cleaning brush when the machine is in a non-operational mode prevent brush "set" from occurring thus, preventing motion quality errors in the printing operation.

3 Claims, 2 Drawing Sheets

SLOW BRUSH ROTATION IN STANDBY TO AVOID BRUSH FLAT SPOTS

This is a continuation of application Ser. No. 08/354,391, filed Dec. 12, 1994, now abandoned.

BACKGROUND OF THE INVENTION

This invention relates generally to a cleaning apparatus, and more particularly concerns preventing brush flat spots on a brush by slow rotation.

In an electrophotographic application such as xerography, a charge retentive surface (i.e., photoconductor, photoreceptor or imaging surface) is electrostatically charged, and exposed to a light pattern of an original image to be reproduced to selectively discharge the surface in accordance therewith. The resulting pattern of charged and discharged areas on that surface form an electrostatic charge pattern (an electrostatic latent image) conforming to the original image. The latent image is developed by contacting it with a finely divided electrostatically attractable powder referred to as "toner". Toner is held on the image areas by the electrostatic charge on the surface. Thus, a toner image is produced in conformity with a light image of the original being reproduced. The toner image may then be transferred to a substrate (eg., paper), and the image affixed thereto to form a permanent record of the image to be reproduced. Subsequent to development, excess toner left on the charge retentive surface is cleaned from the surface. The process is well known, and useful for light lens copying from an original, and printing applications from electronically generated or stored originals, where a charge surface may be imagewise discharged in a variety of ways. Ion projection devices where a charge is imagewise deposited on a charge retentive substrate operates similarly.

Although a preponderance of the toner forming the image is transferred to the paper during transfer, some toner invariably remains on the charge retentive surface, it being held thereto by relatively high electrostatic and/or mechanical forces. Additionally, paper fibers, Kaolin and other debris have a tendency to be attracted to the charge retentive surface. It is essential for optimum operation that the toner remaining on the surface be cleaned thoroughly therefrom.

A commercially successful mode of cleaning employed on automatic xerographic devices utilizes a brush with soft conductive fiber bristles or with insulative soft bristles which have suitable triboelectric characteristics.

The following disclosures may be relevant to various aspects of the present invention and may be briefly summarized as follows:

U.S. Pat. No. A-4,490,871 to Martin discloses an apparatus mounted in shower stall including a rotatably mounted brush member that oscillates in a vertical plane or a horizontal plane depending upon the selection chosen by the user of the invention. A set screw having a thumb turn portion to facilitate its manipulation, is provided to act as a brake to slow the rotation of the brush, if desired.

U.S. Pat. No. A-3,818,859 to Kalmar discloses a low volume spray apparatus adapted to apply a mist spray of a high density liquid to the surfaces of fruit and vegetables or the like. The apparatus comprises a rotary brush which is mounted for slow continuous rotation in a position adjacent to the fruit to be sprayed. The coating material is placed in a container which is located so that a peripheral segment of the brush travels therethrough to pick up small quantities of the liquid material on the radially extending bristles.

SUMMARY OF INVENTION

Briefly stated, and in accordance with one aspect of the present invention, there is provided an apparatus for removing particles from a surface in a printing machine, the printing machine having operational and non-operational modes, comprising: a deformable member having movement in the non-operational mode; a member in contact with the deformable member; and means for at least periodically moving the deformable member and the member relative to one another to prevent contact therebetween in a common area for a substantial length of time to prevent forming a planar region on the deformable member.

Pursuant to another aspect of the present invention, there is provided a method for removing particles from a surface, with a deformable member, in an electrostatographic machine in contact with a member. The method comprises: stopping operation of the electrostatographic machine; and moving the deformable member and the member, relative to one another, to prevent contact therebetween in a common area for a substantial period of time to prevent forming a planar region on the deformable member.

BRIEF DESCRIPTION OF THE DRAWINGS

Other features of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 3:
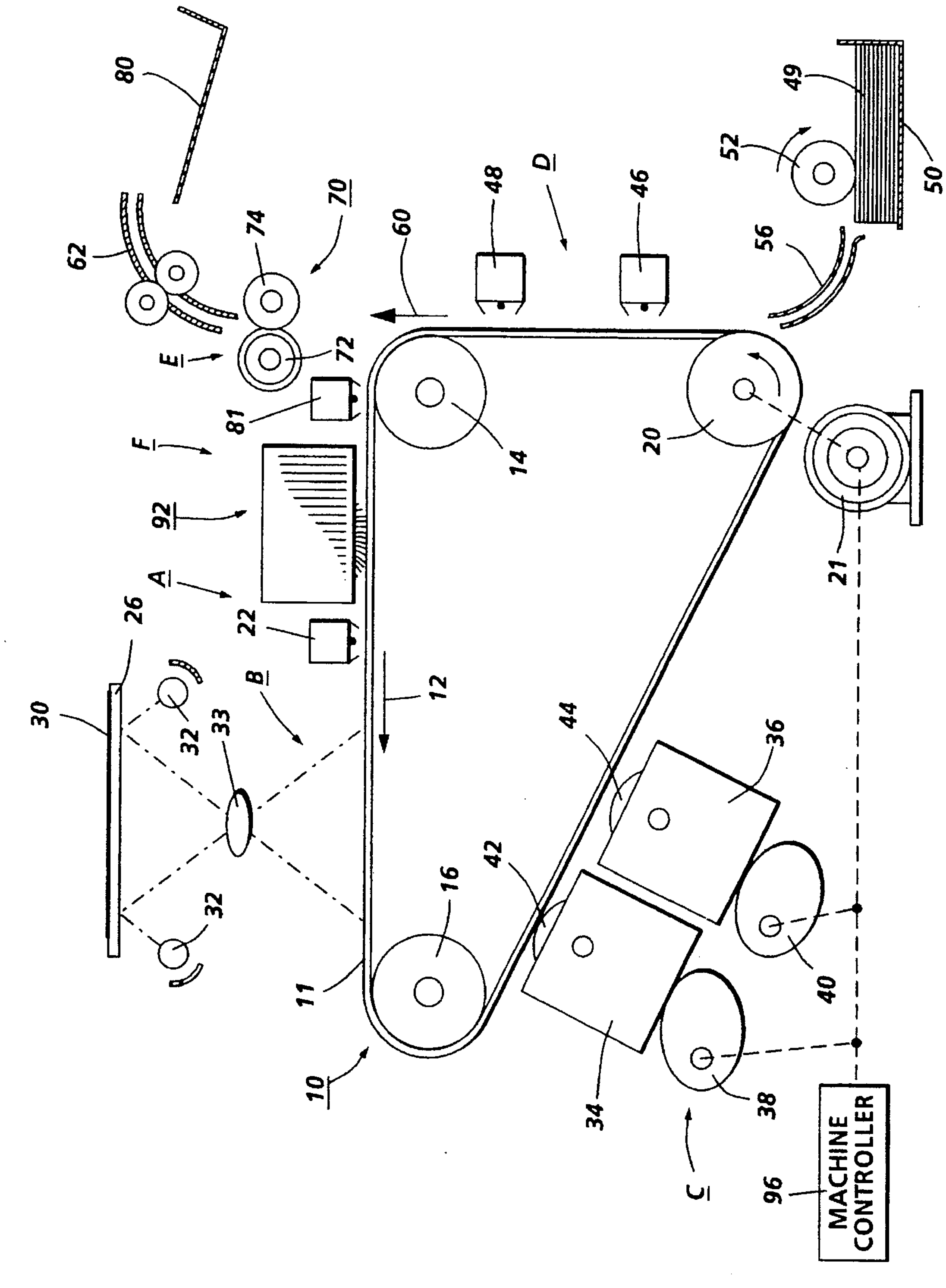
FIG. 3 is a schematic illustration of a printing apparatus incorporating the inventive features of the present invention.

For a general understanding of an electrophotographic printer or copier in which the present invention may be incorporated, reference is made to FIG. 3 which depicts schematically the various components thereof. Hereinafter, like reference numerals will be employed throughout to designate identical elements. Although the electrostatic brush cleaner with a secondary cleaner apparatus of the present invention is particularly well adapted for use in an electrophotographic printing machine, it should become evident from the following discussion, that it is equally well suited for use in other applications and is not necessarily limited to the particular embodiments shown herein.

Referring now to the drawings, the various processing stations employed in the reproduction machine illustrated in FIG. 3 will be described briefly hereinafter. It will no doubt be appreciated that the various processing elements also find advantageous use in electrophotographic printing applications from an electronically stored original, and with appropriate modifications, to an ion projection device which deposits ions in image configuration on a charge retentive surface.

A reproduction machine, in which the present invention finds advantageous use, has a photoreceptor belt 10, having a photoconductive (or imaging) surface 11. The photoreceptor belt 10 moves in the direction of arrow 12 to advance successive portions of the belt 10 sequentially through the various processing stations disposed about the path of movement thereof. The belt 10 is entrained about a stripping roller 14, a tension roller 16, and a drive roller 20. Drive roller 20 is coupled to a motor 21 by suitable means such as a belt drive. The belt 10 is maintained in tension by a pair of springs (not shown) resiliently urging tension roller 16 against the belt 10 with the desired spring force. Both stripping roller 14 and tension roller 16 are rotatably mounted. These rollers are idlers which rotate freely as the belt 10 moves in the direction of arrow 12.

With continued reference to FIG. 3, initially a portion of the belt 10 passes through charging station A. At charging station A, a corona device 22 charges a portion of the photoreceptor belt 10 to a relatively high, substantially uniform potential, either positive or negative.

At exposure station B, an original document is positioned face down on a transparent platen 30 for illumination with flash lamps 32. Light rays reflected from the original document are reflected through a lens 33 and projected onto the charged portion of the photoreceptor belt 10 to selectively dissipate the charge thereon. This records an electrostatic latent image on the belt which corresponds to the informational area contained within the original document. Alternatively, a laser may be provided to imagewise discharge the photoreceptor in accordance with stored electronic information.

Thereafter, the belt 10 advances the electrostatic latent image to development station C. At development station C, one of at least two developer housings 34 and 36 is brought into contact with the belt 10 for the purpose of developing the electrostatic latent image. Housings 34 and 36 may be moved into and out of developing position with corresponding cams 38 and 40, which are selectively driven by motor 21. Each developer housing 34 and 36 supports a developing system such as magnetic brush rolls 42 and 44, which provides a rotating magnetic member to advance developer mix (i.e. carrier beads and toner) into contact with the electrostatic latent image. The electrostatic latent image attracts toner particles from the carrier beads, thereby forming toner powder images on the photoreceptor belt 10. If two colors of developer material are not required, the second developer housing may be omitted.

The photoreceptor belt 10 then advances the developed latent image to transfer station D. At transfer station D, a sheet of support material such as paper copy sheets is advanced into contact with the developed latent images on the belt 10. A corona generating device 46 charges the copy sheet to the proper potential so that it becomes tacked to the photoreceptor belt 10 and the toner powder image is attracted from the photoreceptor belt 10 to the sheet. After transfer, a corona generator 48 charges the copy sheet to an opposite polarity to detack the copy sheet from the belt 10, whereupon the sheet is stripped from the belt 10 at stripping roller 14.

Sheets of support material 49 are advanced to transfer station D from a supply tray 50. Sheets are fed from tray 50 with sheet feeder 52, and advanced to transfer station D along conveyor 56.

After transfer, the sheet continues to move in the direction of arrow 60 to fusing station E. Fusing station E includes a fuser assembly, indicated generally by the reference numeral 70, which permanently affixes the transferred toner powder images to the sheets. Preferably, the fuser assembly 70 includes a heated fuser roller 72 adapted to be pressure engaged with a backup roller 74 with the toner powder images contacting the fuser roller 72. In this manner, the toner powder image is permanently affixed to the sheet, and such sheets are directed via a chute 62 to an output 80 or finisher.

Residual particles, remaining on the photoreceptor belt 10 after each copy is made, may be removed at cleaning station F. The cleaner of the present invention is represented by the reference numeral 92. Removed residual particles may also be stored for disposal.

A machine controller 96 is preferably a known programmable controller or combination of controllers, which conventionally control all the machine steps and functions described above. The controller 96 is responsive to a variety of sensing devices to enhance control of the machine, and also provides connection of diagnostic operations to a user interface (not shown) where required.

As thus described, a reproduction machine in accordance with the present invention may be any of several well known devices. Variations may be expected in specific electrophotographic processing, paper handling and control arrangements without affecting the present invention. However, it is believed that the foregoing description is sufficient for purposes of the present application to illustrate the general operation of an electrophotographic printing machine which exemplifies one type of apparatus employing the present invention therein.

Figure 1:
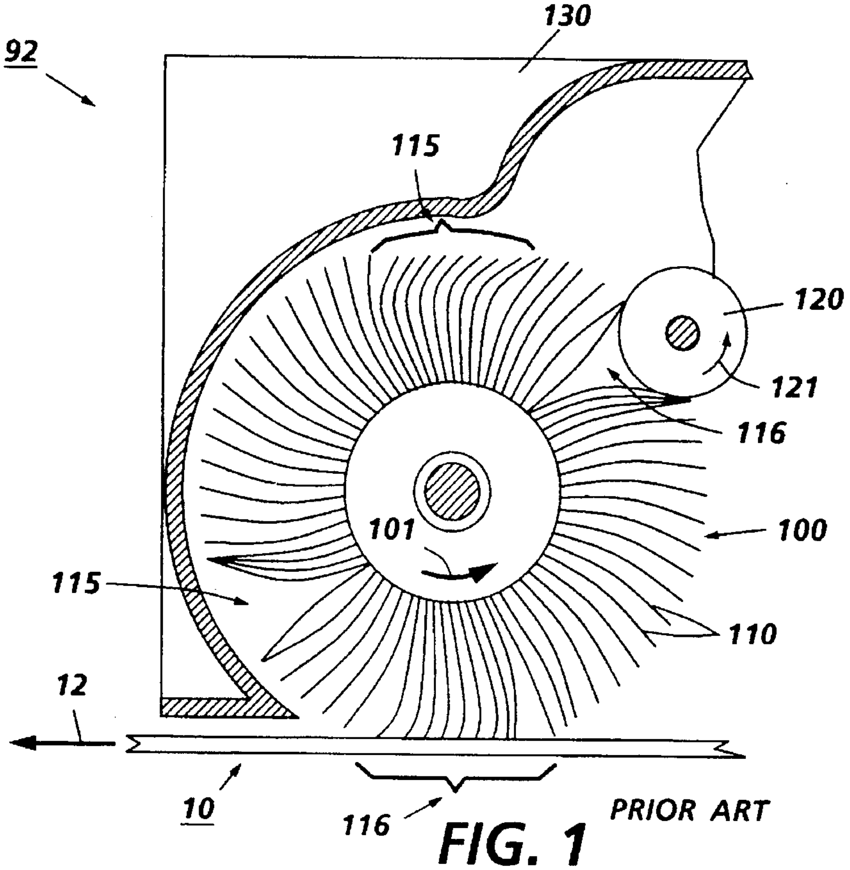
FIG. 1 is an elevational schematic of the cleaning brush, of the prior art, developing a void and/or flat spot due to "set" at the detoning roll or photoreceptor that remains as the brush fibers are rotated past the detoning roll.

Referring now to FIG. 1, which shows an elevational schematic of a cleaning brush, of the prior art, developing a void or flat spot due to "set" at the detoning roll that remains as the brush fibers are rotated past the detoning roll. The electrostatic brush cleaner 92 comprises an electrostatic brush 100 inside a housing 130. The brush 100 rotates in a direction shown by arrow 101. The brush fibers 110 are detoned by a detoning roll 120. The detoning roll rotates in a direction shown by arrow 121. The electrostatic brush cleaner 92 in the prior art allows the brush fibers to remain in stationary contact with the detoning roll 120 and/or the the photoreceptor 10 in the standby mode or when the electrostatographic machine is switched off (i.e. the brush 100 is stationary). It is noted that the printing machine is considered to be in a non-operational mode when it is in standby or turned off. After time in the stationary position, "set" 115 (e.g. brush fibers deform) of the brush 100 will occur in the nip regions between the brush 100 and contact surfaces (e.g. imaging surface and/or the detoning roll surface). (The nip region is that region of contact between the brush fibers 110 and the detoning roll surface of the imaging surface.) (The amount of time for significant "set" to occur in the brush cleaner, when the machine is not in use (i.e. non-operational), is a function of the brush fiber material and environmental conditions. For example, the time for set to occur when the machine is not in operation can vary from several hours to overnight. Furthermore, the voids and/or flat spots are removed at approximately the rate at which they are formed.) The brush fibers 110 deform causing a void or flat spot 115 in the brush 100 after prolonged compression contact 116 with the detoning roll 120 or the surface of the photoreceptor 10 in the standby mode where the brush and detoning and/or photoreceptor surfaces are stationary. This void and/or flat spot 115 impairs cleaning and impacts motion quality of the photoreceptor 10. In the present invention (see FIG. 2), the brush 100 is slowly rotated when the cleaner is in the standby mode thus, preventing sufficient time in the nip regions for stationary compression contact between the brush fibers 110 and the detoning roll 120 for a void and/or flat spot 115 (see FIG. 1) to form. The present invention is not limited to a brush cleaner but is also applicable to any roller to prevent deformation resulting in a void and\or flat spot.

With continuing reference to FIG. 1, electrostatic brush, detoning roll cleaners operate by removing the residual toner from the photoreceptor 10 with mechanical and electrostatic forces. The fibers 110 on the brush touch the residual toner on the photoreceptor 10 in the photoreceptor nip region. The toner is then transported by the brush 100 to the detoning roll 120 and the brush 100 touches the detoning roll 120 in the detoning nip region. When the cleaner is in standby or the printing machine is off, the brush fibers 110 deform due to the contact areas (i.e. detoning roll 120 and photoreceptor 10) around the brush 100. A void and/or flat spot 115 occurs if the brush is stationary for a long enough period of time in the compressed state 116. When the brush is rotated again, the void and/or flat spot 115 will slowly disappear. If the void and/or flat spot 115 is large enough, both cleaning and motion quality of the photoreceptor 10 can be damaged.

Figure 2:
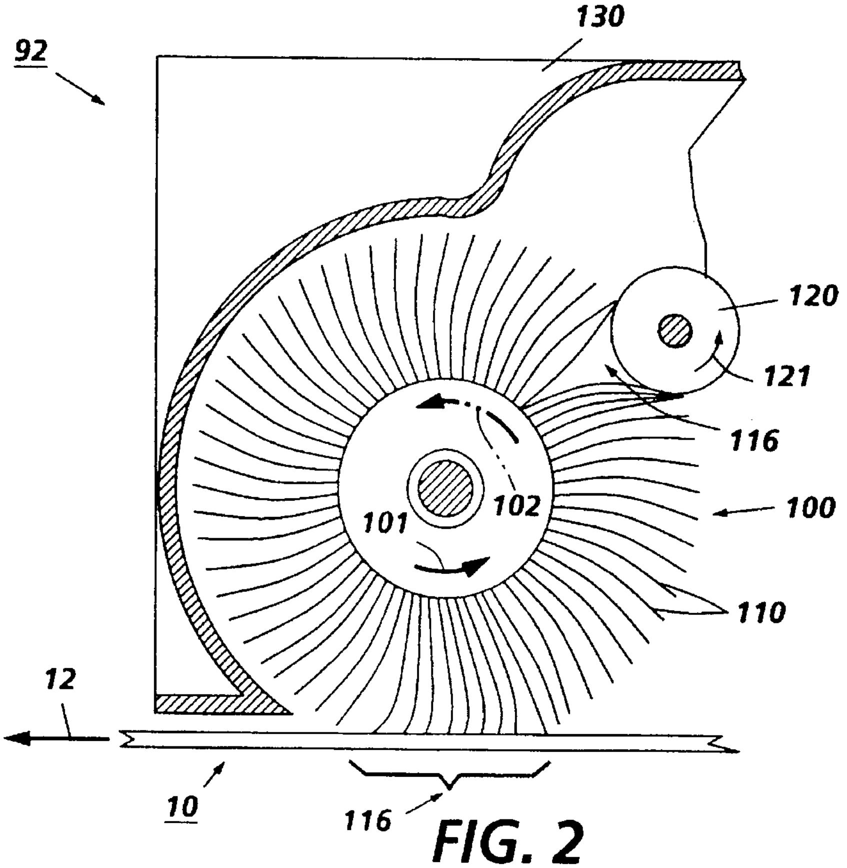
FIG. 2 is an elevational schematic of a cleaning brush, of the present invention, that does not retain the void or flat spot as the brush fibers are rotated past the detoning roll.

Referring now to FIG. 2, which shows an elevational schematic of a cleaning brush, of the present invention, that does not retain the void or flat spot as the brush fibers are rotated past the detoning roll. Brush cleaning of a surface is dependent upon the number of brush fibers 110 available in the cleaning nip to contact toner particles. When there is a flat spot 115 (see FIG. 1) in the brush 100, the number of brush fibers 110 available to contact the photoreceptor 10 to remove toner particles is reduced. The brush flat spots decrease the brush interference and result in reduced cleaning capability of the surface by the brush cleaner, as shown if FIG. 1.

With continued reference to FIG. 2, the compression force from the brush is dependent on the stiffness of the brush fibers and the interference to the photoreceptor. When there is a flat spot 115 (see FIG. 1) in the brush 100, the fibers 110 are bent and less rigid thus, having lower interference with the photoreceptor surface. This causes a decrease in the compression force on the photoreceptor 10 from the brush 100. A decrease in compression or normal force on the photoreceptor 10 will cause a decrease in drag on the photoreceptor 10. This decrease or change in drag can cause motion quality errors depending on the magnitude of the drag change and how fast the drag changes which is dependent on brush speed.

With continued reference to FIG. 2, a brush void and/or flat spot 115 (see FIG. 1) is avoided by removing the brush 100 from any contact regions or by not allowing the brush 100 to stay in compressed contact 116 for a long enough period of time for a void and/or flat spot to occur. Removing the brush from a contact region is expensive in a conventional cleaner. In the present invention, the brush is allowed to "creep" so that the brush does not remain in contact in one area long enough for a flat spot to occur. "Creeping" the brush can be accomplished by allowing the cleaner drive to rotate very slowly in standby in the direction of arrow 10. Since fuser rolls can also develop flat spots and they are frequently driven together with the cleaner, "creeping" of the cleaner brushes can be compatible with the fuser. Allowing the cleaner brush to rotate slowly in standby is also an inexpensive way of avoiding flat spots in the cleaner brush.

With continuing reference to FIG. 2, the use of slow brush rotation to avoid flat spots during retraction of cleaning brushes can also apply to single pass color or black and white copiers, in addition to image on image multi-pass color machines. In a retracting cleaning brush machine (eg., multi-pass image-on-image) the brush may remain in contact with a detoning roll or flicker bar. In order to prevent the formation of a flat spot in the brush when left in this condition for a long length of time the brush can be slowly rotated. This prevents the brush fiber "set" in a single location which creates flat spots where the brush remains in contact with both the detoning roll or flicker bar and the photoreceptor when the machine is not making copies. This condition results in two flat spots, one each from the detoning nip and the photoreceptor nip (three flat spots if a flicker bar is used with a detoning roll). To prevent these flat spots the brush can be rotated slowly while engaged with the photoreceptor in the same manner as was done in the retracted brush case. For example, the brush can be rotated at a speed of less than five rpm to avoid flat spots or voids.

The brush rotation used in preventing the formation of flat spots need not be continuous. The motor driving the brush may be pulsed (indicated by a phantom arrow 102 in FIG. 2) over very short time periods to provide an intermittent rotation of the brush. The pulse duration should be short enough to prevent the brush from reaching high speeds which could result in toner emissions. A typical pulse rotation may be approximately the angular distance of the interferences to the brush (eg., the photoreceptor nip width). The period of time between pulses need not be particularly short since the time before a significant amount of set occurs is relatively long. For example, the brush motor could be pulsed to rotate the brush 10 degrees to 20 degrees every one to five minutes while the machine is in the standby mode without set occurring. The deformable brush, detoning roll or roller rotates at one angular velocity when the printing machine is in a non-operational mode, and at another angular velocity when the printing machine is operational. The angular velocity when the printing machine is operational is greater than the angular velocity when the printing machine is not operational.

In recapitulation, the present invention discloses continuous slow rotation or periodic (eg. pulsing) rotation of a cleaner brush to avoid flat spots or voids in the cleaner brush caused by prolong stationary contact of the brush fibers with another surface.

It is therefore apparent, that there has been provided in accordance with the present invention, a brush that avoids flat spots that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

It is claimed:

1. A method for preventing set from occurring in a deformable member of a printing machine, the printing machine having operational and non-operational modes, comprising:

moving a deformable member in the operational mode by a moving means to remove particles from an image surface of a printing machine, said deformable member comprising a cleaner brush having fibers extending radially from a core;

compressibly contacting the fibers of said cleaner brush with a member, wherein said member causes set to occur in said fibers of said cleaner brush; and periodically moving said cleaner brush and said member relative to one another in a non-operational mode by said moving means to prevent contact therebetween in a common area, said periodic moving preventing set from occurring in said fibers of the cleaner brush during %he non-operational mode.

2. A method of claim 1, wherein said member is a detoning roll.

3. The method of claim 1, further comprising:

contacting the fibers of said cleaner brush with the image surface of the printing machine during the non-operational mode; and further moving said cleaner brush and said surface relative to one another by said moving means to prevent contact therebetween in a common area, said further moving preventing set from occurring in said fibers of the cleaner brush during the non-operational mode.

* * * * *